US012461033B2

(12) United States Patent
Chouket et al.

(10) Patent No.: US 12,461,033 B2
(45) Date of Patent: Nov. 4, 2025

(54) APPARATUS FOR PERFORMING PHOTOCHEMICAL MEASUREMENTS ON A LIQUID OR LIQUID-CONTAINING SAMPLE

(71) Applicants: CENTRE NATIONAL DE LA RECHERCHE SCIENTIFIQUE, Paris (FR); ECOLE NORMALE SUPERIEURE DE PARIS, Paris (FR); SORBONNE UNIVERSITE, Paris (FR)

(72) Inventors: Raja Chouket, Paris (FR); Agathe Espagne, Paris (FR); Ludovic Jullien, Paris (FR); Annie Lemarchand, Paris (FR); Thomas Le Saux, Paris (FR); Agnès Pellissier-Tanon, Paris (FR); Laurence Signon Colonna Bozzi, Grosseto Prugna (FR); Ruikang Zhang, Paris (FR)

(73) Assignees: CENTRE NATIONAL DE LA RECHERCHE SCIENTIFIQUE, Paris (FR); ECOLE NORMALE SUPERIEURE DE PARIS, Paris (FR); SORBONNE UNIVERSITE, Paris (FR)

( * ) Notice: Subject to any disclaimer, the term of this patent is extended or adjusted under 35 U.S.C. 154(b) by 832 days.

(21) Appl. No.: 17/768,463

(22) PCT Filed: Jul. 31, 2020

(86) PCT No.: PCT/EP2020/071659
§ 371 (c)(1),
(2) Date: Apr. 12, 2022

(87) PCT Pub. No.: WO2021/078419
PCT Pub. Date: Apr. 29, 2021

(65) Prior Publication Data
US 2023/0141123 A1  May 11, 2023

(30) Foreign Application Priority Data

Oct. 24, 2019 (EP) .................................... 19306385

(51) Int. Cl.
*G01N 21/64* (2006.01)
*G01N 21/65* (2006.01)
(Continued)

(52) U.S. Cl.
CPC ......... *G01N 21/6458* (2013.01); *G01N 21/65* (2013.01); *G02B 21/08* (2013.01);
(Continued)

(58) Field of Classification Search
CPC ............... G01N 21/6458; G01N 21/65; G01N 2021/6419; G01N 21/6456; G01N 21/645;
(Continued)

(56) References Cited

U.S. PATENT DOCUMENTS

2007/0057198 A1* 3/2007 Wilson ................. G07D 7/1205
250/458.1
2011/0057119 A1* 3/2011 Connally ............... G02B 21/16
250/233
(Continued)

FOREIGN PATENT DOCUMENTS

JP    2007271529 A    10/2007
JP    2007530916 A    11/2007
(Continued)

OTHER PUBLICATIONS

Ruikang Zhang et al: "Simple imaging protocol for autofluorescence elimination and optical sectioning in fluorescence endomicroscopy", Optica, vol. 6, No. 8, Jul. 30, 2019 (Jul. 30, 2019), p. 972, XP055682935, DOI:10.1364/OPTICA.6.000972 (Year: 2019).*
(Continued)

*Primary Examiner* — Jennifer Wecker
*Assistant Examiner* — Britney N. Washington
(74) *Attorney, Agent, or Firm* — HAUPTMAN HAM, LLP (57) ABSTRACT

An apparatus for performing photochemical measurements on a liquid or liquid-containing sample includes a light
(Continued)

generating system, an optical system configured for directing light from the light generating system towards the sample and a sensing system for measuring at least one optical property of the sample, wherein the light generating system is configured for generating light with intensity levels adjustable within a range, spanning at least three and preferably at least five orders of magnitude; and in that the optical system is configured for directing light from the light generating system towards the sample so as to generate a substantially uniform light intensity level, within a cylindrical region of the sample having a height larger than or equal to five time its radius.

15 Claims, 8 Drawing Sheets (51) Int. Cl.
G02B 21/08 (2006.01)
G02B 21/16 (2006.01)
G02B 27/14 (2006.01)

(52) U.S. Cl.
CPC .......... *G02B 21/16* (2013.01); *G02B 27/141* (2013.01); *G01N 2021/6419* (2013.01)

(58) Field of Classification Search
CPC .... G01N 21/6408; G02B 21/08; G02B 21/16; G02B 27/141; G02B 21/00
See application file for complete search history.

(56) References Cited

U.S. PATENT DOCUMENTS

2012/0287244 A1* 11/2012 Bennett .................. G02B 21/16
348/46
2019/0212268 A1 7/2019 Querard et al.
2019/0242825 A1* 8/2019 Oxborough ......... G01N 33/1826

FOREIGN PATENT DOCUMENTS

| JP | 2020034468 A | 3/2020 |
| WO | 2010099118 A1 | 9/2010 |
| WO | 2015/075209 A1 | 5/2015 |
| WO | 2018/041588 A1 | 3/2018 |
| WO | 2019058152 A1 | 3/2019 |

OTHER PUBLICATIONS

Ruikang Zhang et al., "Simple imaging protocol for autofluorescence elimination and optical sectioning in fluorescence endomicroscopy," Optica 6, 972-980 (2019) (Year: 2019).*

Zhang, et al., "Simple imaging protocol for autofluorescence elimination and optical sectioning in fluorescence endomicroscopy", Optica, vol. 6, Issue 8, pp. 972-980, 2019.

Marriott, et al., "Optical lock-in detection imaging microscopy for contrast enhanced imaging in living cells", Proc. Natl. Acad. Sci., vol. 105, No. 46, pp. 17789-17794, 2008.

Widengren, "Fluorescence-based transient state monitoring for biomolecular spectroscopy and imaging", J. R. Soc. Interface, 7, pp. 1135-1144, 2010.

Richards, et al., "Synchronously amplified fluorescence image recovery (SAFIRe)", J. Phys. Chem. B, 114, pp. 660-665, 2010.

Querard, et al., "Photoswitching kinetics and phase-sensitive detection add discriminative dimensions for selective fluorescence imaging", Angew. Chem. Int. Ed., pp. 2633-2637, 2015.

Querard, et al., "Resonant out-of-phase fluorescence microscopy and remote imaging overcome spectral imitations", Nat. Comm., vol. 8, Article No. 969, 2017.

Valm, et al., "Applying systems-level spectral imaging and analysis to reveal the organelle interactome", Nature, vol. 546, pp. 162-167, 2017.

Lakowicz, et al., "Fluorescence lifetime imaging", Analytical Biochemistry, vol. 202, Issue 2, pp. 316-330, May 1, 1992.

* cited by examiner

APPARATUS FOR PERFORMING PHOTOCHEMICAL MEASUREMENTS ON A LIQUID OR LIQUID-CONTAINING SAMPLE

CROSS-REFERENCE TO RELATED APPLICATIONS

This application is a National Stage of International patent application PCT/EP2020/071659, filed on Jul. 31, 2020, which claims priority to foreign European patent application No. EP 19306385.6, filed on Oct. 24, 2019, the disclosures of which are incorporated by reference in their entirety.

The invention relates to an apparatus for performing photochemical measurements on a liquid or liquid-containing sample. More particularly, it relates to an apparatus for measuring at least a kinetic parameter of a photochemical reaction involving at least one chemical species contained in the sample under different illumination conditions. The kinetic parameter may be, for instance, a quantum yield or a relaxation time of the reaction or of a step thereof.

The invention applies, for instance, to the measurement of relaxation times of photoactive chemical species such as fluorescent molecules—in particular fluorescent proteins (FPs) and reversibly photoswitchable fluorescent proteins (RSFPs). The invention is not limited to the case of fluorescent molecules, and applies to all photoactive chemical species showing a change in at least an optical property (fluorescent emission, absorbance, absorption spectrum, Raman scattering, etc.) under the effect of light. Also, the invention is not limited to the measurement of relaxation times, but can measure different parameters describing the temporal evolution (kinetics) of photochemical reactions affecting such an optical property.

The term "chemical species" is understood to mean a molecule, a molecular ion or a complex.

A "photoactive chemical species" is a chemical species undergoing a chemical transformation under the effect of light.

"Reversibly photoswitchable" molecules are a particular class of photoactive species (e.g. proteins) that have at least two distinct states having different optical (e.g. fluorescence) properties and that may be made to pass from one state to the other reversibly under the effect of light. Examples of fluorescent reversibly photoswitchable species are "Dronpa" and the complex "Spinach-DFHBI" ("Spinach" being an RNA aptamer and DFHBI a fluorogenic probe). These species may in particular be used as labels or markers.

Fluorescence imaging, and particularly fluorescence microscopy, has become essential for biology in view of the high sensitivity and versatility of fluorescent labels. The common approach to identify and discriminate fluorescent labels is to read out the fluorescence signal in the spectral domain. Yet spectral discrimination exhibits limitations for highly multiplexed observations. Even with a rich hardware of light sources, optics corrected for chromatic aberration, dichroic mirrors, optical filters, etc., spectral analysis of overlapping absorption and emission bands can routinely discriminate a maximum of four labels. State-of-the art spectral unmixing brings this number to six, five of which are genetically encoded ([Valm 2017]) but at significant cost in terms of photon budget and computation time. This severely limits the discriminative power of emerging genetic engineering strategies.

Since the optimization of fluorophores (cross section for light absorption, quantum yield of luminescence, half-width of absorption/emission bands) has essentially reached its physical limits and fluorescence should remain a much favored observable for imaging live cells, it is highly desirable to complement the spectral dimension by one or more additional dimensions for further discriminating fluorophores. And indeed several techniques have been developed to discriminate fluorophores using dynamical—i.e. temporal—information characterizing their absorption-fluorescence emission photocycles.

For instance, in Fluorescence Lifetime Imaging Microscopy (FLIM), the lifetimes of excited states have been exploited to distinguish fluorophores ([Lakowicz 1992]). However, beyond requiring sophisticated instruments and fast electronics, this technique is limited by the narrow lifetime dispersion (over less than an order of magnitude) of the bright fluorophores currently used in fluorescence imaging. Hence multiplexed fluorescence lifetime imaging has necessitated deconvolutions (which take time) or the adoption of subtractive schemes (which lack robustness and decrease the signal-to-noise ratio).

Reversibly photoswitchable fluorophores (RSF—of which RSFP are a subclass) do not suffer from this drawback. These labels benefit from a rich photochemistry, which goes much beyond the absorption-fluorescence emission photocycle. In reversibly photoswitchable fluorophores, illumination drives several photocycles including photochemical and thermal steps, which intervene over a wide palette of relaxation times ($\mu$s to s) so as to facilitate discrimination at timescales compatible with real time observations of biological phenomena. Hence several protocols have exploited the time response of the fluorescence to light variations for imaging spectrally similar RSFs ("dynamic contrast") by relying on neither deconvolution nor subtraction schemes. One may mention for instance OLID (Optical Lock-In Detection), described in [Marriott 2008]; TRAST (Transient State Imaging Microscopy), described in [Widengren 2010]; SAFIRe (Synchronously Amplified Fluorescence Image Recovery), described in [Richards 2010], OPIOM (Out-of-Phase Imaging after Optical Modulation), described in [Querard 2015] and in WO 2015075209; and Speed OPIOM ([Querard 2017] and WO2018/041588.

Prior to implementing these protocols, it is necessary to characterize the labels by measuring their relaxation times for one or several excitation wavelengths (OLID, SAPHIRe, and Speed OPIOM rely on two-color illumination). In some cases, moreover, the relaxation times may be dependent on the illumination intensity (this happens in particular when the rate of the photochemical reaction on which the detection relies is limited by a light-induced step, rather than a thermal-induced step). The effect of light intensity on photochemical kinetics also needs to be characterized.

Such a characterization, however, can be very cumbersome. First, it is not currently possible to explore all the relevant intensity ranges—which may extend over 5 orders of magnitude, or even more, depending on the different types of fluorescence microscopy (from $10^{-1}$-$10^{1}$ W/cm$^2$ for widefield microscopy up to $10^{4}$-$10^{6}$ W/cm$^2$ for confocal microscopy)—with a single measurement apparatus. Second, measurements performed on liquid or liquid-containing samples are suitable to be affected by diffusion effects, as fresh ground-state and illuminated molecules continuously feed and quit the detection region respectively. It is worth noting that while diffusion makes more difficult extracting relevant photochemical information from the measured signal, it also has a favorable effect in that the continuous refreshing of the sample between successive measurements mitigates the detrimental influence of bleaching, which may otherwise lead to signal extinction.

There is therefore a need for an apparatus allowing performing photochemical kinetics measurements on a liquid or liquid-containing sample over a wide range of intensities and by keeping the impact of diffusion negligible.

According to the invention, this aim is achieved by an apparatus for performing photochemical measurements on a liquid or liquid-containing sample according to claim 1, comprising: a light generating system, an optical system configured for directing light from the light generating system towards the sample, a processor (PR) configured or programmed for controlling the light generating system by modulating the light intensity values for illuminating the sample according to a predetermined illumination sequence and a sensing system for measuring at least one optical property of the sample, characterized in that:

the light generating system is configured for generating light at least one wavelength with an intensity level adjustable within a range spanning at least three and preferably at least five orders of magnitude; and in that:

the optical system is configured for directing light from the light generating system towards the sample so as to generate a uniform light intensity level, with a tolerance of plus or minus 30%, preferably plus or minus 20% and even more preferably plus or minus 10%, within a cylindrical region of the sample having a height larger than or equal to five times its radius, said radius being of at least 3 µm.

Advantageously, the light generating system may comprise at least a first and a second light sources configured for generating light at a same wavelength (i.e. having at least partially overlapping spectra) and with intensity levels adjustable within a first intensity range and a second intensity range, respectively, the first intensity range comprising intensity levels higher than those of the second intensity range, a union of the first and the second intensity ranges spanning at least three and preferably at least five orders of magnitude.

Advantageously, moreover, the apparatus may comprise a plurality of first light sources configured for generating light at different wavelengths, and a plurality of respective second light sources, each second light source being configured for generating light at a same wavelength (i.e. having at least a partially overlapping spectrum) than a corresponding first light source, the apparatus further comprising at least a first dichroic mirror for combining light beams emitted by the first light sources and a second dichroic mirror for combining light beams emitted by the second light sources.

Particular embodiments of the apparatus constitute the subject matter of the depending claims.

Additional features and advantages of the present invention will become apparent from the subsequent description, taken in conjunction with the accompanying drawings, wherein.

Figure 1:
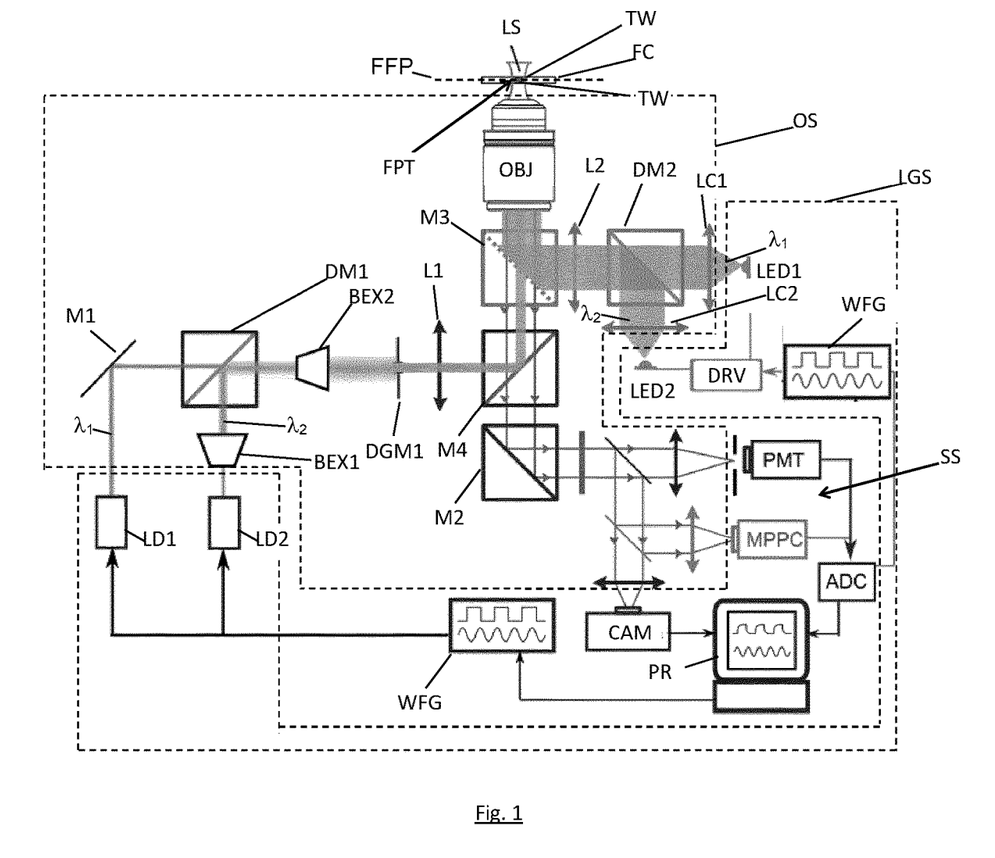
FIG. 1 represents an apparatus according to a first embodiment of the invention, comprising laser sources and LED sources.

FIG. 1 illustrates an apparatus according to a first embodiment of the invention. The apparatus comprises a light generating system LGS for generating light at two different wavelengths with light intensities covering five orders of magnitude (for instance from 0.5 W·cm$^{-2}$ to 50 kW·cm$^2$). It also comprises a fluidic cell FC for containing a liquid sample having at least a transparent wall TW and an optical system OS configured for directing light from the light generating system into the fluidic cell through the transparent wall and for collecting a fluorescent signal issued from the sample, and a sensing system SS for measuring said fluorescent signal.

The fluidic cell FC may be simply formed by two glass plates (e.g. 150 µm thick) held separated by a few to a few tens micrometers (e.g. 50 µm) by spacers. In different embodiments more complex fluidic cells, e.g. including microfluidic circuits, may be used.

Light generating system LGS comprises a Light Emitting Diodes (LED) stage for the "low intensity" regime and a laser diode stage for the "high intensity" regime. Preferably, the "high" intensity and "low" intensity regimes slightly overlap, or have a very small gap between them (less than 10% of the upper bound of the low intensity regime) and their union spans at least three and preferably at least five orders of magnitude.

The LED stage comprises a blue color Light Emitting Diodes LED1 (M470L4, Thorlabs, NJ) filtered at $\lambda_1$=480±20 nm (FF01-480-40, Semrock, Rochester, NY) and a UV Light Emitting Diodes LED2 (M405L3, Thorlabs, NJ) filtered at $\lambda_2$=405±20 nm (ET 405/20x, Chroma Technologies, Bellows Falls, VT) as light sources. The current driving each LED is regulated by a LED driver DRV (DC 4104, Thorlabs, NJ) operated in the external control mode and driven by the two analog outputs of a ADC card (usb-1604hs-2ao, Measurement Computing, Norton, MA) used for data acquisition or a waveform generator WFG.

The laser diode stage comprises a first laser diode LD1 at $\lambda_1$=488 nm (LBX serie, Oxxius, Lannion, France) and a second laser diode LD2 at $\lambda_2$=405 nm (06-01 Serie, Cobolt, Solna, Sweden), both driven by waveform generator WFG.

Optical system OS comprises a first section interfacing with the LED stage of the light generating system, a second section interfacing with the laser diode stage of the light generating system, a third section—comprising an objective OBJ—interfacing with the fluidic cell and a fourth section interfacing with the sensing system SS.

The first section of the optical system comprises two light condensers LC1, LC2 (ACL25416U, Thorlabs, Newton, NJ, f=16 mm) placed just after each one of LED1 and LED2 to collimate light, a movable dichroic mirror M3 (T425LPXR, Chroma Technologies, Bellows Falls, VT) for deflecting the light beams issued by LED1 and LED2—and which is removed from the optical path when the laser diodes are operated—and a lens L2 (f=100 mm) used to focus the light at the front focal plane FFP of objective OBJ.

The second section of the optical system comprises a first beam expander BEX1 (an afocal system made of two lenses: LA1213-A, Thorlabs, NJ, f=50 mm and LA1289-A, Thorlabs, NJ f=30 mm) on the path of the light beam issued from LD2, a mirror M1 for deflecting the light beam issued from LD1, a dichroic mirror DM2 for combining the two light beams, and a second beam expander BEX1 comprising two achromatic lenses (AC254-100-A, Thorlabs, Newton, NJ, f=100 mm and AC254-050-A, Thorlabs, Newton, NJ f=50 mm), a diaphragm DGM1, more precisely an iris (SM1D12CZ, Thorlabs, NJ, US), selecting the central part of the combined and enlarged beams and an achromatic lens L1 (AC254-200-A, f=200 mm, Thorlabs, NJ, US) for focusing them on the rear focal plane of the objective. The iris is conjugated to the front focal plane FFP of the objective, so that the size of the illuminated area can be adjusted by tuning the aperture of the iris. Moreover, as it will be discussed later, the fact of selecting the central part of the laser light beams is instrumental in ensuring an approximately uniform illumination of the sample at high light intensities.

In some other embodiments, the first beam expander may be optional, depending on the properties of LD2.

The third section of the optical system comprises, as already mentioned, a 50× objective OBJ (MPLFLN, NA 0.8, Olympus Corporation, Tokyo, Japan) having a front focal plane FFP comprising a focal point FPT which is inside—and preferably at the center—of the fluidic cell FC.

The fourth section of the optical system comprises a dichroic mirror M4 for separating the fluorescence light collected by objective OBJ, which has already traversed dichroic mirror M3 (if not withdrawn), from the laser beam, and a mirror M2 for deflecting said fluorescence light. A set of beam splitters and focusing lenses allows directing part of the fluorescence light onto a photomultiplier PMT, part of it on a multi-pixel photon counter MPPC and part of it on a camera CAM. The signals issued from the photomultiplier PMT and from the multi-pixel photon counter MPPC are converted to digital format by an analog-to-digital converter ADC and fed to a data processor PR, such as a computer, which also receives signals from the camera CAM. The data processor processes the measurements from the photomultiplier PMT and from the multi-pixel photon counter in order to compute at least a time constant representative of a photochemical reaction within the sample. It also drives the waveform generators WFG, and therefore controls the light sources by turning them on and off and by setting their intensity values for illuminating the sample in the fluidic cell according to a predetermined illumination sequence, examples of which will be provided later (see FIGS. 10A, 10B, 12A, 12B).

The sensing system SS comprises the camera CAM, the photomultiplier PMT and the multi-pixel photon counter MPPC. The camera is used to acquire a fluorescence image of the sample; the photomultiplier PMT and the multi-pixel photon counter MPPC are used to acquire the signals from which the relaxation times are computed. The multi-pixel photon counter MPPC is preferably used with the LEDs.

Figure 2A:
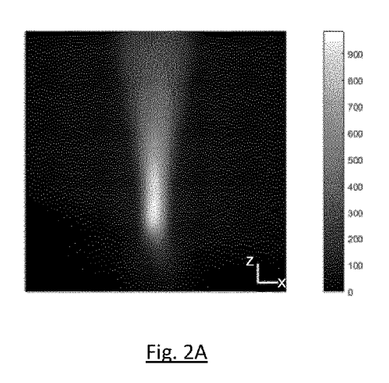
FIGS. 2A and B illustrate the illumination profile produced by the LED sources of the apparatus of FIG. 1.
Figure 2B:
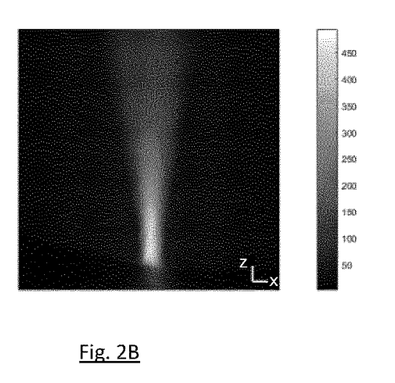

The illumination profiles from the LEDs were characterized by imaging, at $\lambda_1$ and $\lambda_2$, a 5 µM fluorescein solution in pH 7.4 PBS buffer embedded in a 3 mm-thick agarose gel using a 24 mm objective. FIGS. 2A and 2B show that the LED illumination profiles are homogeneous over 2 mm along the z axis (height, parallel to the optical axis) of a 0.5 mm-radius cylinder.

Figure 3A:
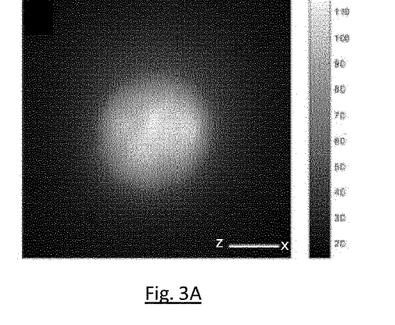
FIGS. 3A-3D illustrate the illumination profile produced by the laser sources of the apparatus of FIG. 1.
Figure 3B:
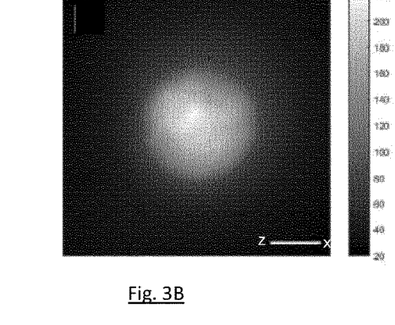
Figure 3C:
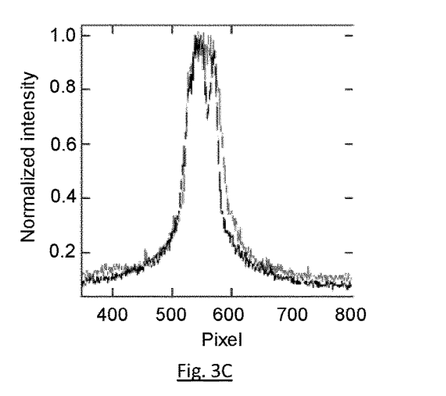
Figure 3D:
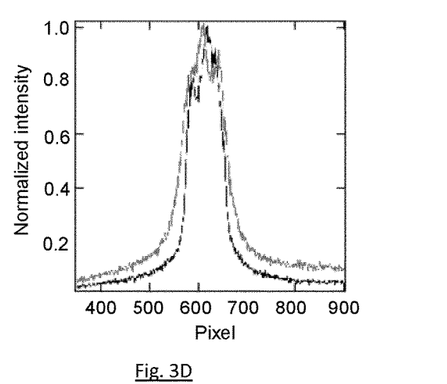

The illumination profiles from the laser diodes were characterized by imaging, at $\lambda_1$ and $\lambda_2$, a thin layer of 10 µM fluorescein solution in pH 7.4 PBS buffer (sandwiched between two glass plates; 5 µm of thickness) at different axial positions ranging from 0 to 125 µm by means of a microscope composed of a 20× objective, a tube lens, an emission filter, and a camera. For each axial position, the diameter of the illuminated area was measured. For the setup displayed in FIG. 1, FIG. 3A (at $\lambda_1$) and 3B (at $\lambda_2$) show that the illuminated area is rather homogeneous at 0 µm. Furthermore the $\lambda_1$ and $\lambda_2$ illumination profiles at 0 and 125 µm, displayed on FIG. 3C, 3D suggest that laser illumination at both wavelengths is substantially homogeneous along a cylindrical profile of height h=125 µm and radius $r_0$=10 µm. In the high-intensity regime the photon flux achieves 300 ein·m$^{-2}$s$^{-1}$ which, at the wavelengths considered here, corresponds to an intensity of about $10^4$ W·cm$^{-2}$. Depending on the photochemical system to be studied, the high-intensity regime could correspond to a slightly lower photon flux, for instance 100 ein·m$^{-2}$S$^{-1}$.

Figure 4:
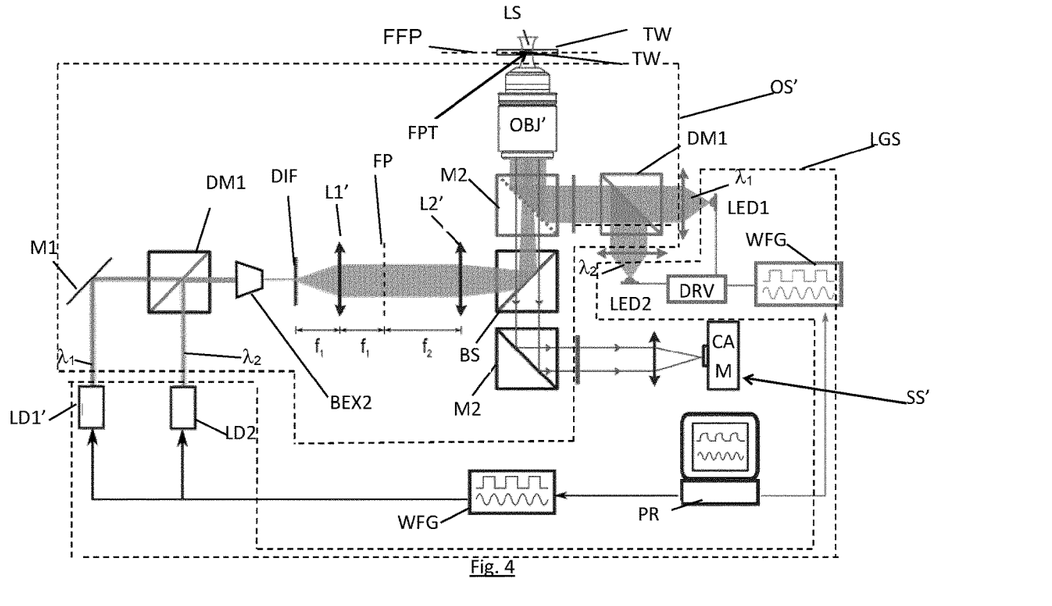
FIG. 4 represents an apparatus according to a second embodiment of the invention, also comprising laser sources and LED sources.

FIG. 4 illustrates an apparatus according to a second embodiment of the invention. Compared to that of FIG. 1, the apparatus of FIG. 4 is better suited for imaging, as it favors a broader field of view, but achieves a slightly lower maximal light intensity. Compared to the apparatus of FIG. 1, that of FIG. 4 has a simpler sensing system SS', only comprising a camera CAM, and an optical system OS' with a different second (laser diode) section.

The second section of optical system OS' comprises:
- an afocal system BEX2 acting as an inverted beam expander consisting of two achromatic lenses (AC254-100-A, Thorlabs, Newton, NJ, f=100 mm and AC254-050-A, Thorlabs, Newton, NJ, f=50 mm) for shrinking the combined beams issued by the two laser diodes (in some other embodiments it may be optional, depending on the properties of the laser diodes);
- a light diffuser DIF (EDC-5, RPC photonics, Rochester, US) for uniformly diffusing the shrunk laser beam within a solid angle of 5°;
- a first achromatic lens L1' (AC254-030-A, Thorlabs, Newton, NJ) for collimating the diffused laser light beam. The diffused beam is therefore projected to the Fourier plane of the lens where spatial uniformity is achieved; and
- a second achromatic lens L2' (AC254-200-A, f=200 mm, Thorlabs, NJ, US) forming an image of a focal plane of the first lens, opposed to the light diffuser, on the rear focal plane of the objective OBJ'. The latter is also different from that of the apparatus of FIG. 1; it is a 60× objective (UPLSAPO60XW, NA 1.2, Olympus Corporation, Tokyo, Japan).

The illumination profiles from the LEDs are the same as that of the apparatus of FIG. 1, and have already been discussed with reference to FIGS. 2A and 2B.

Figure 5A:
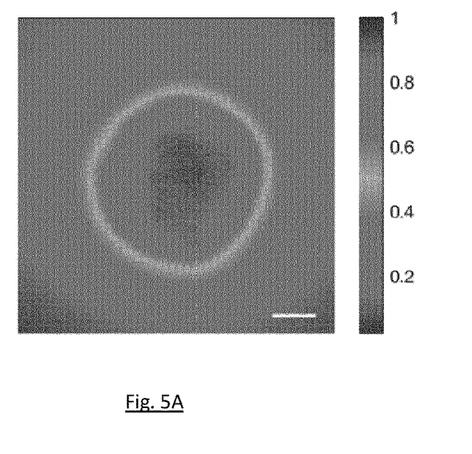
FIGS. 5A-5D illustrate the illumination profile produced by the laser sources of the apparatus of FIG. 4.
Figure 5B:
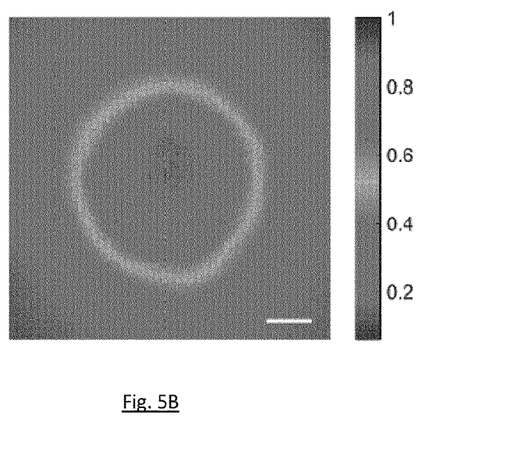
Figure 5C:
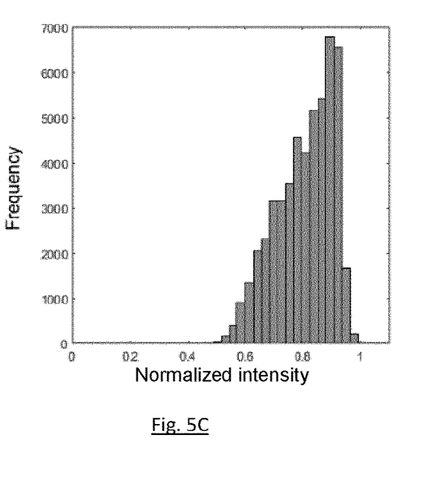
Figure 5D:
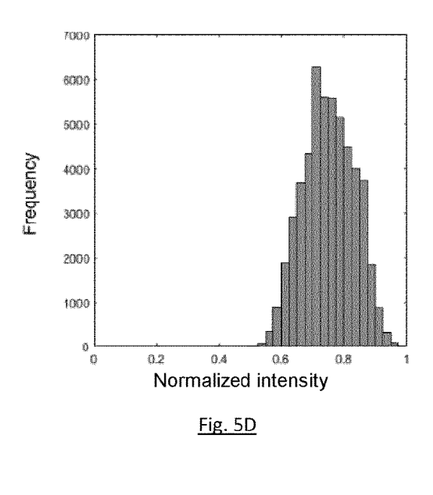

The illumination profiles from the laser diodes have been imaged from mapping the fluorescence emission from a 80 µm-thick layer of 5 µM fluorescein solution in pH 7.4 PBS buffer at $\lambda_1$=488 nm (FIG. 5A LD1) and $\lambda_2$=405 nm (FIG. 5B LD2) at the focal plane FFP of the objective. FIGS. 5C and 5C are histograms showing the distributions of the normalized light intensity at the pixels of the images of FIGS. 5A and 5B, respectively. These histograms show that both light distributions exhibit excellent spatial uniformity with a fluctuation of less than 20% over a disk of 36 µm diameter in the focal plane.

For both embodiments, calibration of the light intensities may be performed by photochemical methods, known by themselves.

The embodiments of FIGS. 1 and 4 are only provided as non-limiting examples, and several different embodiments are possible.

For instance, the light generating system may generate light at only a single wavelength, or conversely at more than two wavelengths. The usable light sources are not limited to LEDs and laser diodes; for instance filtered discharge lamps, solid state or gas lasers etc. may be used instead; also, strongly attenuated (e.g. through expansion) laser beam may be used in the low-intensity mode, in which case a separate light source for each intensity regime may not be needed. Different light sensors may also be used in the sensing system. Also, fluorescence emission is not the only optical property which may be probed; absorption, Raman scattering and refractive index variations may also be measured. Several different layouts for the optical system may also be designed—provided that the optical system is suitable to generate, over all the required intensity range—an approximately uniform light intensity level (with a tolerance of plus or minus 30%, preferable plus or minus 20% and even more preferably plus or minus 10%) within a cylindrical region of the fluidic cell having a height larger than or equal to its radius (hereafter "cylindrical illumination"). Preferably, the radius will be of at least 3 µm and even more preferably of at least 10 µm.

The importance of obtaining cylindrical illumination, rather than "spherical" illumination, which is a first approximate model of illumination by tightly focused light, in order to mitigate the impact of molecular diffusion will now be explained with the help of a two-state model of a photochemical reaction.

Let $C_1$ and $C_2$ be two different states of same chemical species, having different optical properties e.g. fluorescent brightness; for instance, it will be assumed that $C_1$ is fluorescent with brightness Q when illuminated at $\lambda_1$ while $C_2$ exhibits negligible brightness. State $C_1$ is photochemically converted into state $C_2$ at (light-intensity dependent) rate constant $k_{21}{}^i$; state $C_2$ relaxes back to state $C_1$ at rate constant $k_{12}{}^i$ including photochemical and thermally driven contribution. An apparent thermodynamic constant $K_{12}{}^i = k_{12}{}^i/k_{21}{}^i$ is also defined.

Index "i" refers to different illuminating conditions. More particularly, i=1 corresponds to illumination at $\lambda_1$ only, while i=II corresponds to illumination at both $\lambda_1$ and $\lambda_2$. For assessing the impact of diffusion on the fluorescence signal, only the case of type-I illumination will be considered; however type-II illumination will also be used in the illumination sequences discussed later.

It is possible to show, by solving the chemical kinetics equation, that under type-I illumination at intensity $I_1$ the concentrations $C_1{}^I$ and $C_2{}^I$ obey $$C_2^I - C_2^{I,\infty} = C_1^{I,\infty} - C_1^I = -C_2^{I,\infty} \exp\left(-\frac{t}{\tau^I}\right) \quad (1)$$

$$C_1^I + C_2^I = C_{tot}$$

where $C_{tot}$ is the total concentration and $$C_1^{I,\infty} = \frac{1}{1 + K_{12}^I} C_{tot} \quad (2)$$

$$C_2^{I,\infty} = \frac{K_{12}^I}{1 + K_{12}^I} C_{tot}$$

are the steady concentrations reached at large times and $$\tau^I = \frac{1}{k_{12}^I + k_{21}^I} \quad (3)$$

designates the relaxation time of the photochemical conversion of the two species $C_1$ and $C_2$. The fluorescent emission intensity (which is supposed to be only due to $C_1$) is given by $$I_F^I = QC_1^I I_1 \quad (4)$$

and $$\frac{I_F^I}{I_F^{I,0}} = 1 + \frac{QC_{tot}I_1}{I_F^{I,0}} \frac{K_{12}^I}{1+K_{12}^I}\left[\exp\left(-\frac{t}{\tau^I}\right)-1\right] \quad (5)$$

where $I_F^{I,0}$ is the initial fluorescence intensity.

Let $\sigma_{12,1}$ be the molecular cross section for the photoisomerization $C_1 \to C_2$ driven by wavelength $\lambda_1$, $\sigma_{21,1}$ the molecular cross section for the photoisomerization $C_2 \to C_1$ driven by wavelength $\lambda_1$, and $k_{21}{}^\Delta$ the thermal part of the rate constant for $C_2 \to C_1$. The rate constants can then be written:

$$k_{12}' = \sigma_{12,1} I_1$$

$$k_{21}' = \sigma_{21,1} I_1 + k_{21}{}^\Delta \quad (6)$$

and therefore $$\tau^I = \frac{1}{\Sigma_1 I_1 + k_{21}^\Delta} \quad (7)$$

where $\Sigma_1 = \sigma_{12,1} + \sigma_{21,1}$. It can then be seen that $1/\tau_1$ exhibits a linear dependence on $I_1$.

The case of spherical illumination will now be considered. It will be assumed that illumination is homogeneous within a sphere of radius $r_0$=0.3 µm and then vanishes out within a spherical reservoir of radius R=2.2 µm initially containing a liquid solution of the species $C_1$ at concentration $C_{tot}$. Species $C_1$ and $C_2$ are supposed to diffuse with a same diffusion coefficient D, so that their concentrations obey $C_1+C_2=C_{tot}$ everywhere.

In the absence of diffusion (D=0) and in the presence of illumination, $C_1$ exponentially decays to a stationary value $C_1{}^{h,\infty}$ which is reached, to within 1%, in a time $\tau^\infty$, which is a function of $k_{12}$ and $k_{21}$. Outside the sphere, where there is no illumination, $C_1$ remains equal to $C_{tot}$. Taking into account the diffusion, the dynamics of $C_1$ evolution is governed by $$\frac{\partial C_1}{\partial t} = -(k_{12}+k_{21})C_1 + k_{21}C_{tot} + D\left[\frac{\partial^2 C_1}{\partial r^2} + \frac{2}{r}\frac{\partial C_1}{\partial r}\right] \quad (8)$$

Figure 6A:
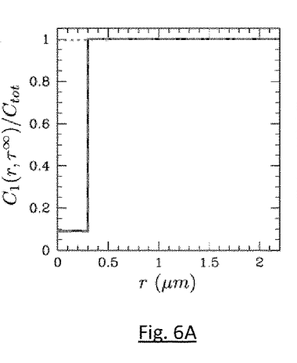
FIGS. 6A-6C and 7A-7D illustrate the impact of diffusion on relaxation time measurement performed using "spherical" illumination geometry.
Figure 6B:
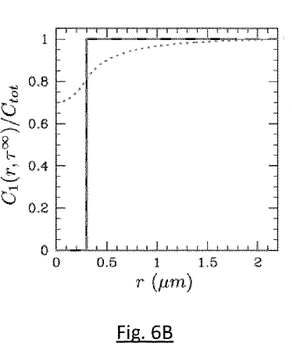
Figure 6C:
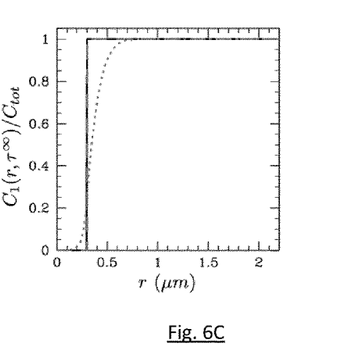
Figure 7A:
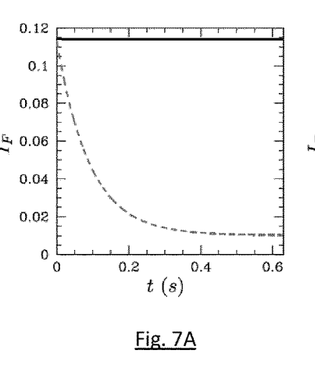
Figure 7B:
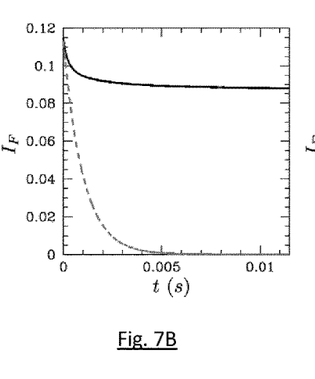
Figure 7C:
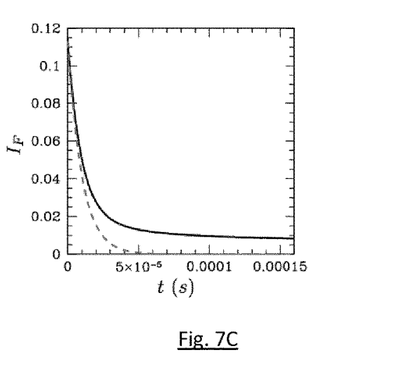

This equation has been solved numerically for $k_{21}=1$ s$^{-1}$, $D=100$ µm$^2$ s$^{-1}$ and three different values of $k_{12}=10$ s$^{-1}$, $10^3$ s$^{-1}$, $10^5$ s$^{-1}$. The results of the numerical integration, normalized over $C_{tot}$, are represented as dotted lines on FIGS. 6A ($k_{12}=10$ s$^{-1}$), 6B ($k_{12}=10^3$ s$^{-1}$) and 6C ($k_{12}=10^5$ s$^{-1}$), while the results for $D=0$ (stepwise constant concentration) are represented as solid lines. FIGS. 7A, 7B and 7C represents the time evolution of the fluorescence intensity without (solid line) and with (dotted line) diffusion.

Figure 7D:
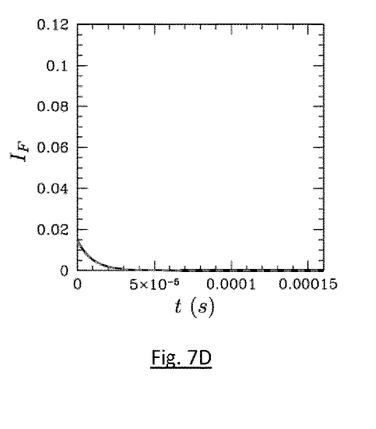

The difference between the results in the presence and absence of diffusion markedly depends on $k_{12}$, more precisely it increases as $k_{12}$ decreases. For high values of $k_{12}$, e.g. $k_{12}=10^5$ s$^{-1}$, this effect can be mitigated by integrating the fluorescence intensity on the inner part of the sphere, e.g. between r=0 and r=$r_0$/2 (this is illustrated on FIG. 7D), provided that the signal-to-noise ratio is sufficient (note that integrating on only half of the radius decreases the volume by a factor of eight, resulting in a decrease of the signal-to-noise ratio of almost an order of magnitude). This, however, is insufficient for lower values of $k_{12}$, e.g. $k_{12} \leq 10^3$ s$^{-1}$.

A more quantitative evaluation of the discrepancy between the results with and without diffusion may be given by computing the difference between the signal in the presence of diffusion and the exponentially-decaying solution $C_1^h$ obtained in the absence of diffusion according to:

$$J = \frac{\int_{t=0}^{\tau^{\infty}} (I'_F - C_1^h V) dt}{(C_{tot} - C_1^{h,\infty}) V \tau^{\infty}} \quad (9)$$

with $I'_F = \int_0^V C_1 dv$ and where V is the volume of the illuminated region, dv is the differential of the volume, and $C_1$ is solution of Eq.(8).

The deviation J tends to 1 when the rate constant $k_{12}$ is small compared to the typical frequency $D/r_0^2$ and vanishes for sufficiently large values of $k_{12}$. As expected, J is smaller and the results are improved for a smaller value of the diffusion coefficient. Interestingly, J does not sensitively depend on the rate constant $k_{21}$. Calculations show that the determination of the relaxation time using the exponential decay without diffusion is valid to within a few percent in a spherical reactor for $r_0=0.3$ µm and $D=100$ µm$^2$ s$^{-1}$ only if the rate constant $k_{12}$ of the photochemical step is larger than or equal to $10^7$ s$^{-1}$, which is very restrictive. More generally, a cutoff rate constant $$k_{12}^c \simeq 10^4 \frac{D}{r_0^2} \quad (10)$$

can be introduced.

Diffusion is negligible to within a few percent in the spherical geometry provided that $k_{12} \geq k_{12}^c$. Even with a larger cell of radius $r_0=10$ µm, the condition would become $k_{12} \geq 10^4$ s$^{-1}$, which remains constraining.

Figure 8:
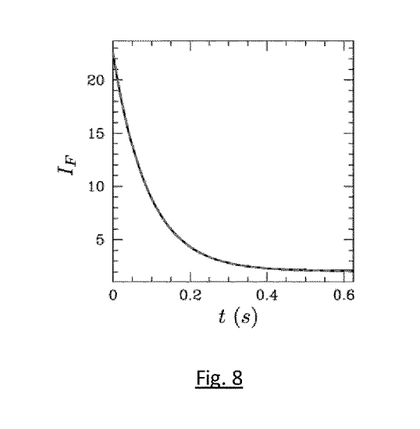
FIG. 8 illustrates the impact of diffusion on relaxation time measurement performed using "cylindrical" illumination geometry according to the invention.

Similar calculations have been performed considering a homogeneous illumination within a cylinder with height h=80 µm, radius $r_0=0.3$ µm and R=2.2 µm. FIG. 8 shows that the time evolution of the fluorescence signal with diffusion (D=100 µm$^2$ s$^{-1}$) are indistinguishable from that obtained in the absence of diffusion (dotted line—representing data with diffusion—overlaps the solid line corresponding to the no-diffusion case) even for a very small value of $k_{12}$ ($k_{12}=10$ s$^{-1}$) and a very small cell radius $r_0=0.3$ µm. More generally, in cylindrical geometry, the cutoff rate constant (above which diffusion is negligible) is given by $$k_{12}^c \simeq \frac{D}{r_0^2} \quad (11)$$

which is much more favorable (by a factor of $10^4$) than the result obtained in spherical geometry. These results have been obtained for h=80 µm, which can be considered "infinite" compared with the radius of the cylinder and that of the spherical reservoir (and indeed an infinite value for h has been used in numerical computations), however they approximately hold whenever h is sufficiently larger than $r_0$, and particularly when h$\geq 5 \cdot r_0$ and even more when h$\geq 10 \cdot r_0$.

Figure 11:
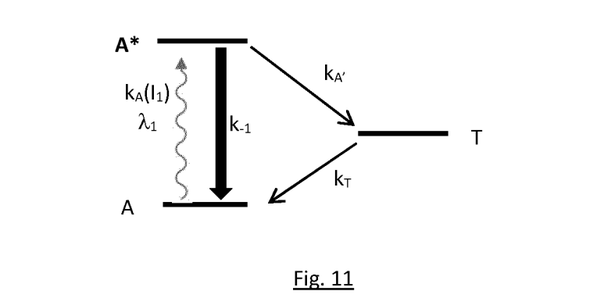
FIG. 11 is an energy level scheme of an hypothetical FP suitable to be characterized using an apparatus according to the invention and the transitions between these energy levels.
Figure 12A:
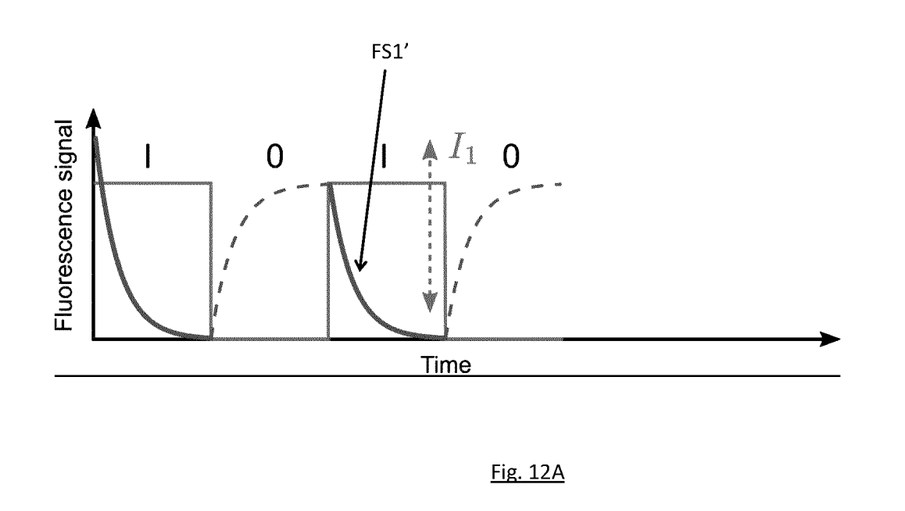
FIGS. 12A and 12B illustrate an illumination and measurement sequence suitable to be used to characterize the FP of FIG. 11.
Figure 12B:
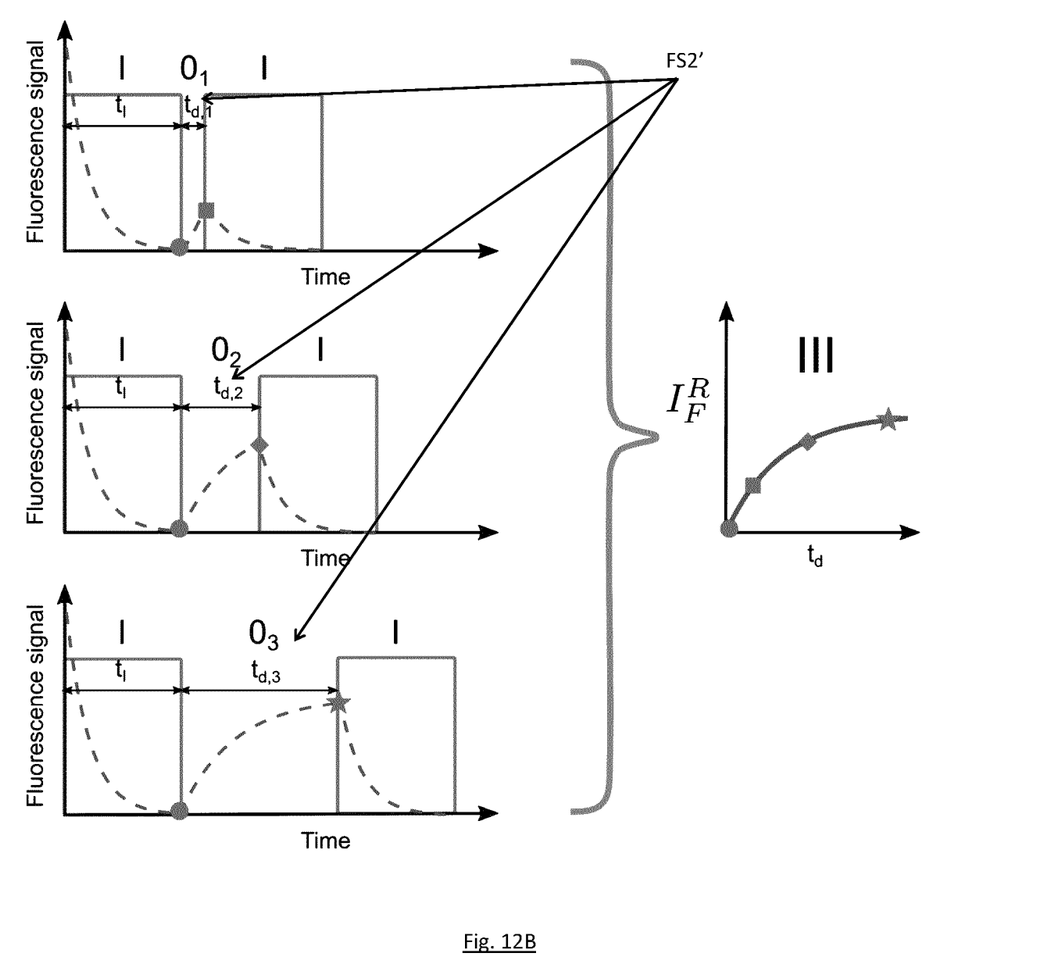

The use of the apparatuses of FIGS. 1 and 4 for determining time constants representative of a photochemical reaction within a sample will now be discussed with the help of two examples. The first example concerns the measurement of relaxation times in a reversibly photoswitchable fluorescent protein (RSFP) and is illustrated by FIGS. 9A, 9B, 10A and 10B. The second example concerns the measurement of relaxation times in a fluorescent protein (FP) and is illustrated by FIGS. 11, 12A and 12B.

Figure 9A:
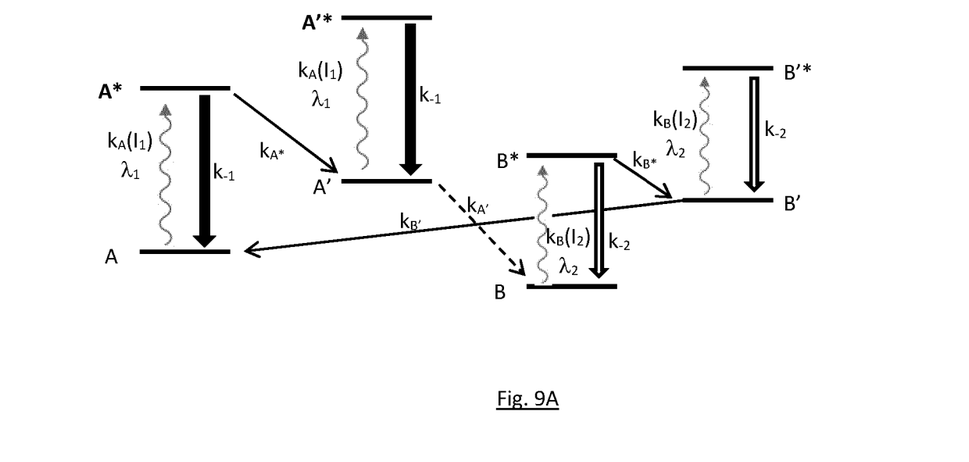
FIG. 9A is an energy level scheme of an hypothetical RSFP suitable to be characterized using an apparatus according to the invention and the transitions between these energy levels.

A hypothetical RSFP, whose energy levels are shown in FIG. 9A, can take four different configurations, designated by A, A', B and B', each one existing either in a ground state or in an excited state A*, A'*, B*, B'*. States A* and A'* are fluorescent and, for the sake of simplicity, they are considered to have a same brightness and identical absorption and fluorescence spectra. States B* and B'* are not fluorescent, or have a much lower brightness than A* and A'*.

Absorption of a photon at wavelength $\lambda_1$ excites state A to A* and state A' to A'* with a rate constant $k_A(I_1)$ proportional to the light intensity $I_1$ at wavelength $\lambda_1$. Radiative decay occurs very fast, with rate constant $k_{-1}$, independent of light intensity. Moreover, state A* can also experience non-radiative decay to state A' at a thermal (i.e. independent of light intensity) rate constant $k_A*$, and A' can experience non-radiative decay to state B at a comparatively small thermal rate $k_A'$. The conversion of molecules from state A to B, through a photochemical step (A→A*) and two thermal steps (A*→A', quite fast, and A'→B, slow) results in a progressive reduction of the fluorescence intensity.

Absorption of a photon at wavelength $\lambda_2$ excites state B to B* and state B' to B'* with a rate constant $k_B(I_2)$ proportional to the light intensity $I_2$ at wavelength $\lambda_2$. Non-radiative decay occurs very fast, with rate $k_{-2}$, independent from light intensity. Moreover, state B* can also experience a slower non-radiative decay to state B' at a thermal (i.e. independent from light intensity) rate $k_B*$, and B' can experience non-radiative decay to state A at a comparatively small thermal rate $k_B'$. The conversion of molecules in state B to A, through a photochemical step (B→B*) and two thermal steps (B*→B', B'→A) results in a progressive recovery of fluorescence.

For realistic light intensities, state A* is created with a rate constant ($k_A$) which is much lower than the destruction rate constant ($k_{-1}+k_{A*}$), therefore a quasi-steady state is quickly achieved. The same applies to states A'*, B* and B'*. This leads to the simplified photocycle of FIG. 9B, comprising only states A, A', B and B'. Fluorescence emission is proportional to the sums of the concentrations of A and A' (weighted sum, if the brightness of these states are different).

Figure 9B:
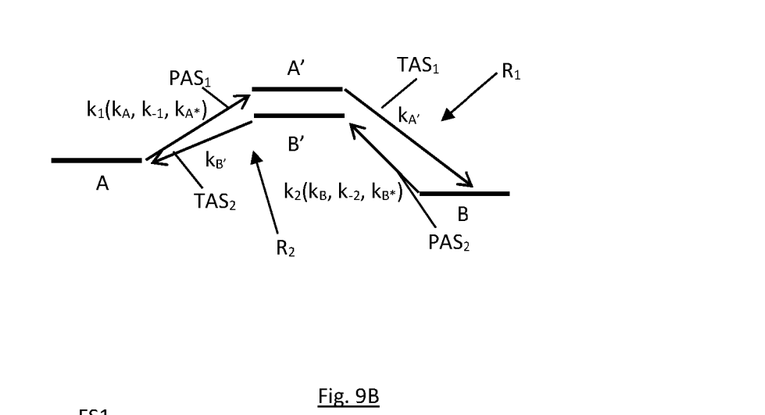
FIG. 9B is a reduced energy level scheme obtained through a quasi-steady state approximation.

Bright state A is converted into dark state B through a first reaction $R_1$ comprising a photochemical step PAS$_1$A→A' with rate constant $k_1$, which is a function of $k_A$, $k_{-1}$ and $k_{A*}$ and depends on $I_1$ through $k_A$, and a thermal step $TAS_1$ A'→B with intensity-independent rate constant $k_{A'}$ (note that the first step alone does not affect the fluorescence signal, under the simplifying assumption of identical brightness of A and A'). Dark state B is converted back to bright state A through a second reaction $R_2$ comprising a photochemical step $PAS_2$ B→B' with rate constant $k_2$, which is a function of $k_B$, $k_{-2}$ and $k_{B*}$ and depends on $I_2$ through $k_B$, and a thermal step $TAS_2$ B'→A with intensity-independent rate constant $k_{B'}$ (note that the first step alone does not affect the fluorescence signal, as both B and B' are dark).

Illuminating the RSFP at wavelength $\lambda_1$ (illumination type I) induces then a fluorescence signal decreasing with time. At "low" $I_1$ values (i.e. light intensities at $\lambda_1$), the decay rate of the fluorescent signal will essentially be determined by the photochemical step $PAS_1$, while at "high" $I_1$ values it will essentially be determined by the thermal step $TAS_1$. Therefore, measurements at different light intensities at wavelength $\lambda_1$ ($I_{low}$ and $I_{high}$ conditions) will provide non-redundant information on the RSFP dynamics.

When the fluorescence signal is extinguished, or at least has reached a plateau, illuminating RSFP at both wavelengths $\lambda_2$ and $\lambda_1$ (illumination type II) will induce a recovery of the fluorescence signal. Note that the recovery is due to the photochemical reaction induced by photons at $\lambda_2$, but photons at $\lambda_1$ are required to excite A and A' and get non-vanishing fluorescence emission. At "low" $I_2$ values (i.e. light intensities at $\lambda_2$), the recovery rate of the fluorescent signal will essentially be determined by the photochemical step $PAS_2$, while at "high" $I_2$ values it will essentially be determined by the thermal step $TAS_2$. Therefore, measurements at different light intensities at wavelength $\lambda_2$ ($II_{low}$ and $II_{high}$ conditions) will provide additional non-redundant information on the RSFP dynamics. Overall, the RSFP can be identified by four relaxation times issued from four measurements performed in different illumination conditions. An interesting application of that is to enable discrimination of the RSFP in a four-dimensional space whose dimensions are function (e.g. logarithms) of the relaxation times.

In order to measure relaxation times characterizing the RSFP, the data processor drives the light sources of the apparatus to illuminate the sample according to an illumination sequence which is constituted by a plurality of subsequences. Each subsequence is a succession of periods consisting of a type-I illumination time window and a type-II illumination time window, as illustrated on FIGS. 10A and 10B.

More precisely, in a first set of subsequences (FIG. 10A) the light intensity at $\lambda_1$ is constant and gradually increased or decreased, over a broad range (as broad as allowed by the apparatus) from one subsequence of the set to another, while the light intensity at $\lambda_2$ alternates between zero and a constant value. A first series of measurements FS1 of the (decreasing) fluorescence signal is performed during type-I time windows of the subsequences. Suitable data processing, e.g. an exponential fitting, allows determining a decrease rate constant of the fluorescence signal as a function of $I_1$. This rate constant tends towards $k_1$ for vanishingly small light intensities (when the photochemical step of the reaction is slower than the thermal one and therefore dominates the kinetics) and towards $k_A$, for very high intensities (when the thermal step is slower than the photochemical one and therefore dominates the kinetics).

In a second set of subsequences (FIG. 10B) the light intensity at $\lambda_2$ alternates between zero and a constant value gradually increased or decreased, over a broad range (as broad as allowed by the apparatus) from one subsequence of the set to another, while the light intensity at $\lambda_1$ is maintained at a constant value. A second series of measurements FS2 of the (increasing) fluorescence signal is performed during type-II time windows of the subsequences. Suitable data processing, e.g. an exponential fit, allows determining a recovery rate constant of the fluorescence signal as a function of $I_2$. This rate constant tends towards $k_2$ for vanishingly small light intensities (when the photochemical step of the reaction is slower than the thermal one and therefore dominates the kinetics) and towards $k_B$, for very high intensities (when the thermal step is slower than the photochemical one and therefore dominates the kinetics).

Figure 10A:
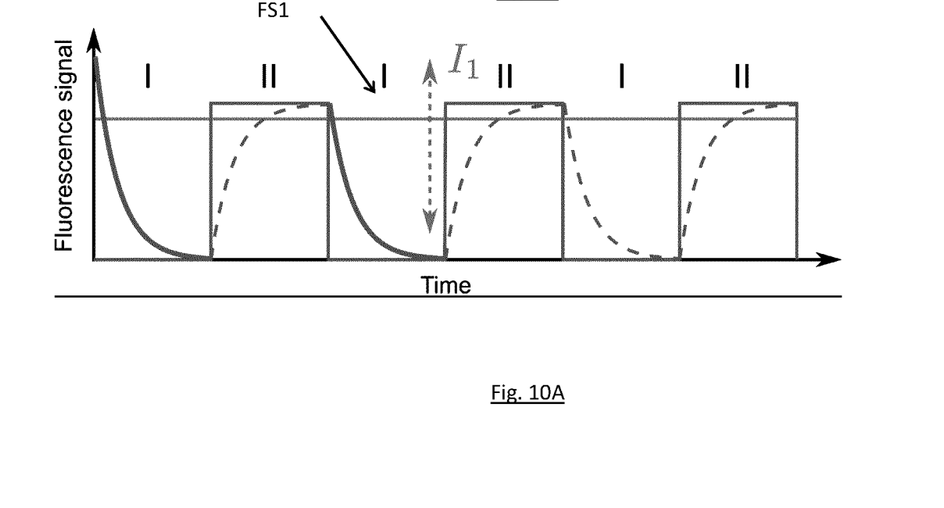
FIGS. 10A and 10B illustrate an illumination and measurement sequence suitable to be used to characterize the RSFP of FIGS. 9A and 9B.
Figure 10B:
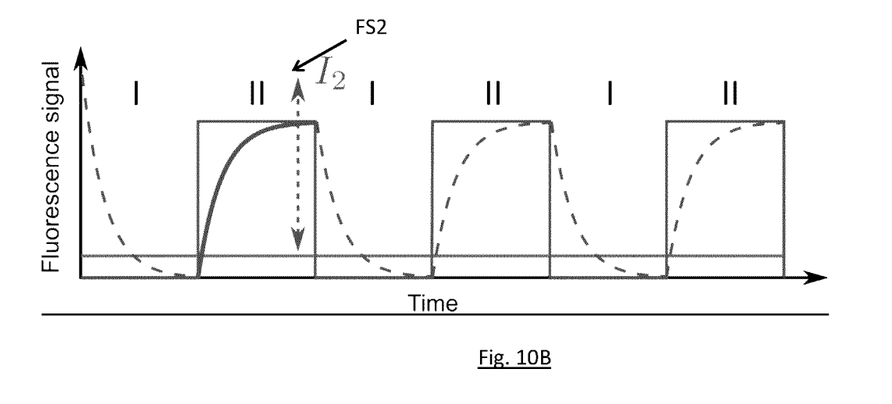

In the examples of FIGS. 10A and 10B each subsequence comprises three periods, FS1 measurements are performed in the type-I window of the second period, FS2 measurements are performed in the type-II window of the first period and the third period is used to assess the effects of bleaching. Alternatively, the FS1 measurements may be performed in the first type-I window of the first period: the chemical dynamics during this time window is singular. However the relaxation time extracted from a simple exponential has been experimentally found similar to the one extracted from the type-I window of the second period. The advantage of using the first type-I window is that the amplitude of the signal change is higher.

In order to determine suitable durations for the time windows, in a preliminary step, type-I and type-II illuminations are alternatively applied using strong LED light and the fluorescence evolution at the transition is analyzed using an unsupervised bi-exponential fitting, yielding a "fast" and a "slow" relaxation time. The duration of the time windows is set chosen larger than a few times the order of magnitude of the thus-determined fast relaxation time. For instance, in an embodiment of the invention, the half period (i.e. duration of a time window) has been set at 5 s for LED illumination, while for laser illumination the half period was chosen inversely proportional to the light intensity ($I_1$ during the measurement of FIG. 10A, $I_2$ during the measurement of FIG. 10B) to minimize the influence of diffusion.

FIG. 11 shows the energy levels and transitions for a fluorescent protein (FPs) having a dark lower triplet state. Absorption of a photon at wavelength $\lambda_1$ excites ground state A to A* with a rate constant $k_A(I_1)$ proportional to the light intensity $I_1$. Radiative decay occurs very fast, with rate constant $k_{-1}$, independent of light intensity. Moreover, state A* can also experience non-radiative decay to the dark triplet state T at a much lower thermal (i.e. independent of light intensity) rate constant $k_{A*}$. In turn, the triplet state T returns to the ground state A with a thermal rate constant $k_T$.

In order to measure relaxation times characterizing the FP, the data processor drives the light sources of the apparatus to illuminate the sample according to an illumination sequence which is constituted by a plurality of subsequences. Each subsequence comprises a succession of time windows wherein the sample is illuminated with a constant intensity at $\lambda_1$ (type-I illumination) alternating with second time windows θ of increasing (more generally, varying) durations wherein the sample is not illuminated. The constant intensity of the type-1 illumination increases from one subsequence to the next. FIG. 12A is a zoom of the first three time windows of a subsequence, while FIG. 12B displays the application of variable time delay $t_d$ in the dark at fixed light intensity $I_1$ and the reconstruction of the recovered signal $I_F^R$ using the signal difference between the beginning of the second illumination and steady-state at the end of the first illumination.

A first series of measurements FS1' of the (decreasing) fluorescence signal is performed during at least one type-I illumination time window of each subsequence (FIG. 12A). Suitable data processing, e.g. an exponential fit, allows determining a decrease rate of the fluorescence signal as a function of $I_1$, representative of $k_4$. It is assumed that the time windows are long enough to ensure that the fluorescence signal does not anymore significantly vary before its end.

A second series of measurements FS2' are performed at the beginning of the type-I illumination time windows (note that a same measurement may belong to both the first and the second series of measurement), as illustrated on the left part of FIG. 12B. Each measurement provides information on the recovery of the fluorescence signal during the varying durations $t_{d,1}$, $t_{d,2}$, $t_{d,3}$ . . . of the "dark" windows $0_1$, $0_2$, $0_3$ (not necessarily monotonically increasing as in the present example). These measurements allow reconstructing a fluorescence recovery signal (right part of FIG. 12B). Suitable data processing, e.g. an exponential fit, allows determining a recovery rate of the fluorescence signal as a function of $I_1$, representative of $k_T$.

It should be understood that different illuminations and measurement sequences may be used for characterizing RSFP, FP. For instance, during a subsequence the light intensities may be modulated continuously instead of being switched on and off, or switched between two nonzero values (e.g. a small but non-vanishing intensity at wavelength $\lambda_2$ may be maintained during the "type-I" time windows of FIGS. 10A and 10B).

Also, other fluorophores and more generally other, not necessarily fluorescent, photochemically active samples may be characterized.

The samples need not be a homogeneous liquid contained in a fluidic cell. For instance, the sample may be or include a suspension, a gel, an emulsion, a porous material with liquid-filled pores, a compartmentalized liquid (e.g. cytoplasm in a cell or biological tissue), etc. Moreover, even if the inventive apparatus is optimized for dealing with liquid or liquid-containing samples in which molecular diffusion is important, it can also be used to analyze samples showing no or little molecular diffusion at the scale of the illuminated region, such as crystalline or amorphous solids.

Figure 13A:
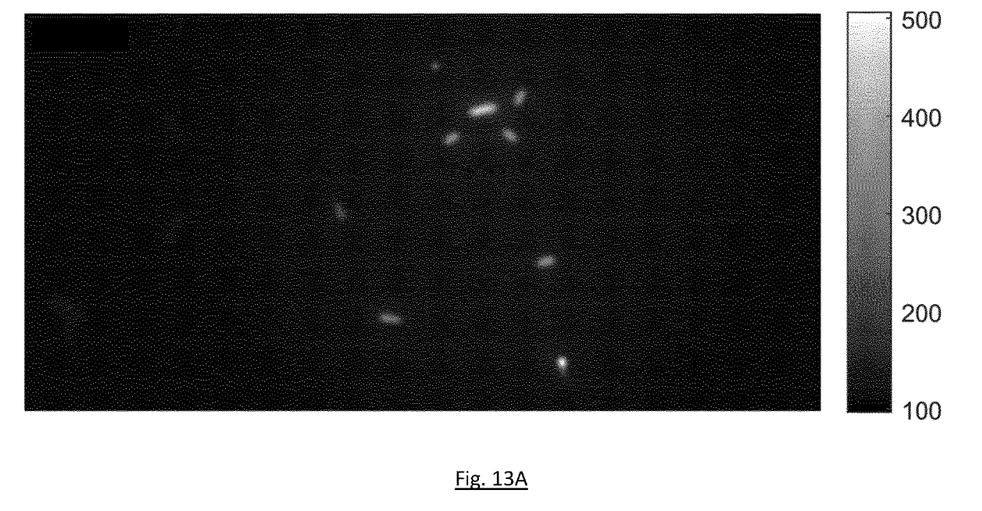
FIGS. 13A, 13B and 13C illustrate the application of an apparatus according to the second embodiment of the invention to the imaging of Dronpa-labeled *Escherichia coli* bacteria.
Figure 13B:
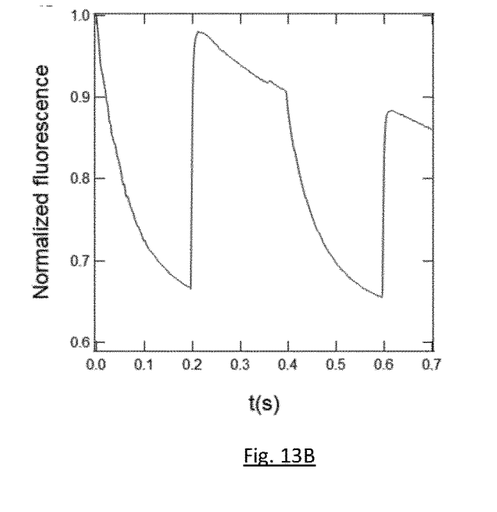
Figure 13C:
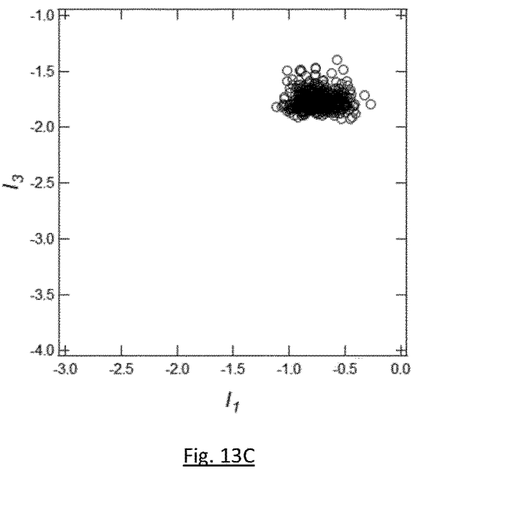

FIG. 13A shows a fluorescence image of Dronpa-labeled *Escherichia coli* bacteria acquired using an imaging apparatus according to FIG. 4. FIG. 13 B is a plot of the time-evolution of the fluorescence intensity of these bacteria upon continuous illumination of intensity $I_1=2$ ein·m$^{-2}$·s$^{-1}$ at $\lambda_1=488$ nm and square-wave illumination of intensity $I_2=0.2$ ein·m$^{-2}$·s$^{-1}$ at $\lambda_2=405$ nm; the fluorescence decay has been mono-exponentially fitted to extract a "low intensity" decay time constant $\tau_{low}^I$. A similar acquisition has been performed upon continuous illumination of intensity $I_1=50$ ein·m$^{-2}$·s$^{-1}$ at $\lambda_1=488$ nm and square-wave illumination of intensity $I_2=20$ ein·m$^{-2}$·s$^{-1}$ at $\lambda_2=405$ nm; a mono-exponential fit has issued a "high intensity" decay time constant $\tau_{low}^I$. FIG. 13 C is a representation of the Dronpa-labeled *Escherichia coli* in the 2D space ($I_1=\log_{10}\tau_{low}^I$, $I_3=\log_{10}\tau_{high}^I$).

REFERENCES

[Marriott 2008] G. Marriott, S. Mao, T. Sakata, J. Ran, D. K. Jackson, C. Petchprayoon, T. J. Gomez, E. Warp, O. Tulyathan, H. L. Aaron, E. Y. Isacoff, and Y. Yan. Optical lock-in detection imaging microscopy for contrast enhanced imaging in living cells. Proc. Natl. Acad. Sci. U.S.A, 105:17789-17794, 2008.

[Widengren 2010] J. Widengren. Fluorescence-based transient state monitoring for biomolecular spectroscopy and imaging. J. R. Soc. Interface, 7:1135-1144, 2010.

[Richards 2010] C. I. Richards, J.-C. Hsiang, and R. M. Dickson. Synchronously amplified fluorescence image recovery (SAFIRe). J. Phys. Chem. B, 114:660-665, 2010.

[Quérard 2015] J. Quérard, T.-Z. Markus, M.-A. Plamont, C. Gauron, P. Wang, A. Espagne, M. Volovitch, S. Vriz, V. Croquette, A. Gautier, T. Le Saux, and L. Jullien. Photoswitching kinetics and phase-sensitive detection add discriminative dimensions for selective fluorescence imaging. Angew. Chem. Int. Ed., 127:2671-2675, 2015.

[Quérard 2017] J. Quérard, R. Zhang, Z. Kelemen, M.-A. Plamont, X. Xie, R. Chouket, I. Roemgens, Y. Korepina, S. Albright, E. Ipendey, M. Volovitch, H. L. Sladitschek, P. Neveu, L. Gissot, A. Gautier, J.-D. Faure, V. Croquette, T. Le Saux, and L. Jullien. Resonant out-of-phase fluorescence microscopy and remote imaging overcome spectral limitations. Nat. Comm., 8:969, 2017.

The invention claimed is:

1. An apparatus for performing photochemical measurements on a liquid or liquid-containing sample comprising: a light generating system, an optical system configured for directing light from the light generating system towards the sample, a processor configured or programmed for controlling the light generating system by modulating the light intensity values for illuminating the sample according to a predetermined illumination sequence and a sensing system for measuring at least one optical property of the sample, wherein:

the light generating system is configured for generating light at least one wavelength with an intensity level adjustable within a range spanning at least three and preferably at least five orders of magnitude; and the optical system is configured for directing light from the light generating system towards the sample so as to generate a uniform light intensity level, with a tolerance of plus or minus 30%, preferably plus or minus 20% and even more preferably plus or minus 10%, within a cylindrical region of the sample having a height larger than or equal to five times its radius, said radius being of at least 3 μm, wherein the illumination sequence comprises a plurality of subsequences, each subsequence comprising, in at least a part of the subsequence, illuminating the sample at the at least one wavelength with a constant intensity, the intensity values at said wavelength varying from one subsequence to the next.

2. The apparatus of claim 1, wherein the light generating system comprises at least a first and a second light sources configured for generating light at a same wavelength and with intensity levels adjustable within a first intensity range and a second intensity range, respectively, the first intensity range comprising intensity levels higher than those of the second intensity range, a union of the first and the second intensity ranges spanning at least three and preferably at least five orders of magnitude.

3. The apparatus of claim 2, comprising a plurality of first light sources configured for generating light at different wavelengths, and a plurality of respective second light sources, each second light source being configured for generating light at a same wavelength than a corresponding first light source, the apparatus further comprising at least a first dichroic mirror for combining light beams emitted by the first light sources and a second dichroic mirror for combining light beams emitted by the second light sources.

4. The apparatus of claim 2, wherein said or at least one said second light source is a light-emitting diode.

5. The apparatus of claim 2, wherein said or at least one said first light source is a laser.

6. The apparatus of claim 5, wherein the optical system comprises:
a beam expander for enlarging a laser light beam emitted by said laser or lasers;
a diaphragm for selecting a central portion of the enlarged laser light beam;
a lens for forming a real image of the diaphragm; and
an objective having a front focal plane, the real image of the diaphragm being on the front focal plane.

7. The apparatus of claim 5, wherein the optical system comprises:
an objective having a front focal plane;
a light diffuser for uniformly diffusing a laser light beam emitted by said laser or lasers;
a first lens disposed to be illuminated by the diffused laser light beam; and
a second lens forming an image of a focal plane of the first lens, opposed to the light diffuser, on the front focal plane of the objective.

8. The apparatus of claim 1, further comprising a fluidic cell suitable to contain the liquid or liquid-containing sample and having at least a transparent wall, the optical system being configured for directing light from the light generating system into the fluidic cell through the transparent wall or walls and for generating said uniform light intensity level within said cylindrical region, which is comprised within the fluidic cell.

9. The apparatus of claim 1, wherein the sensing system comprises a light detector configured for detecting fluorescence emission from the sample.

10. The apparatus of claim 9, wherein the light detector comprises a camera.

11. The apparatus of claim 9, wherein the light detector comprises at least one of a photomultiplier and a multi-pixel photon counter.

12. The apparatus of claim 1, wherein the light generating system is configured so that the range within which the intensity level of the generated light is adjustable extends at least to an upper limit of 100 $ein \cdot m^{-2}s^{-1}$.

13. The apparatus of claim 1, wherein the processor is further configured for processing at least one time series of measurements from the sensing system in order to compute at least a parameter representative of a temporal evolution of a photochemical reaction within the sample.

14. The apparatus of claim 13, comprising a plurality of first light sources configured for generating light at different wavelengths, and a plurality of respective second light sources, each second light source being configured for generating light at a same wavelength than a corresponding first light source, the apparatus further comprising at least a first dichroic mirror for combining light beams emitted by the first light sources and a second dichroic mirror for combining light beams emitted by the second light sources;
wherein:
each subsequence comprises illuminating the sample at a first wavelength with a constant intensity and, simultaneously, at a second wavelength different from the first wavelength with an intensity alternating between a first constant value and a second, larger, constant value, the intensity values at the first wavelength and/or at the second wavelength varying from one subsequence to the next;
the processor is configured for determining at least one first parameter representative of a temporal evolution of a photochemical reaction from a first series of measurements of the optical property of the sample performed while the intensity value at the second wavelength is equal to the first constant value, and at least one second time constant from a second series of measurements of the optical property of the sample performed while the intensity value at the second wavelength is equal to the second constant value.

15. The apparatus of claim 13, wherein:
each subsequence comprises a succession of first time windows wherein the sample is illuminated with a constant intensity alternating with second time windows of increasing durations wherein the sample is not illuminated, the constant intensity varying from one subsequence to the next;
the processor is configured for determining at least one first parameter representative of a temporal evolution of a photochemical reaction from a first series of measurements of the optical property of the sample performed during at least one first time window, and at least one second parameter representative of a temporal evolution of the photochemical reaction from a second series of measurements of the optical property of the sample performed at the beginning of a plurality of successive first time windows.

\* \* \* \* \*